(12) United States Patent
Yoshikawa et al.

(10) Patent No.: US 7,801,641 B2
(45) Date of Patent: Sep. 21, 2010

(54) WORK TRANSFER SYSTEM, ROUTE SETTING METHOD, AND ROUTE SETTING PROGRAM

(75) Inventors: Takeru Yoshikawa, Fukuoka (JP); Keiichi Uchimura, Kumamoto (JP); Zhencheng Hu, Kumamoto (JP); Tsugumitsu Kandabashi, Kumamoto (JP)

(73) Assignees: Hirata Corporation, Shinagawa-Ku, Tokyo (JP); Hirata Software Technology Co., Ltd., Kumamoto-Shi, Kumamoto-Ken (JP)

( * ) Notice: Subject to any disclaimer, the term of this patent is extended or adjusted under 35 U.S.C. 154(b) by 0 days.

(21) Appl. No.: 11/919,981

(22) PCT Filed: Feb. 10, 2006

(86) PCT No.: PCT/JP2006/302331

§ 371 (c)(1),
(2), (4) Date: Jul. 22, 2008

(87) PCT Pub. No.: WO2006/120783

PCT Pub. Date: Nov. 16, 2006

(65) Prior Publication Data

US 2009/0099686 A1    Apr. 16, 2009

(30) Foreign Application Priority Data

May 6, 2005    (JP) .............................. 2005-135416

(51) Int. Cl.
G06F 7/00    (2006.01)
(52) U.S. Cl. .................. 700/228; 700/112; 414/222.01; 414/935
(58) Field of Classification Search .................. 700/97, 700/99–102, 112, 113, 213, 214, 228, 230; 414/222.01, 935, 940
See application file for complete search history.

(56) References Cited

U.S. PATENT DOCUMENTS 5,329,450 A * 7/1994 Onishi ........................ 700/113

(Continued)

FOREIGN PATENT DOCUMENTS

JP    11-126294 A    5/1999

(Continued)

OTHER PUBLICATIONS

International Preliminary Report on Patentability for PCT/JP2006/302331.

(Continued)

*Primary Examiner*—Charles R Kasenge
(74) *Attorney, Agent, or Firm*—Buchanan Ingersoll & Rooney PC

(57) ABSTRACT

A route setting method according to the present invention sets, in a work transfer system including a plurality of work transfer units which connect a plurality of loading places to a plurality of unloading places, a route of the work transfer units to pass a work between a planned loading place and a planned unloading place which are required to transfer the work in the plurality of loading places and the plurality of unloading places. The route setting method includes the steps of setting, based on layout information representing a layout of the plurality of work transfer units, a plurality of candidates of the route between the planned loading place and the planned unloading place, and selecting, based on a predetermined condition, one route from the plurality of candidates of the route set in the candidate setting step.

4 Claims, 11 Drawing Sheets

U.S. PATENT DOCUMENTS

| | | | | |
|---|---|---|---|---|
| 5,402,355 A | * | 3/1995 | Bahlmann et al. | 700/230 |
| 5,867,388 A | * | 2/1999 | Okumura et al. | 700/112 |
| 5,913,201 A | * | 6/1999 | Kocur | 700/101 |
| 5,933,354 A | * | 8/1999 | Shimada et al. | 700/228 |
| 6,125,306 A | * | 9/2000 | Shimada et al. | 700/228 |
| 6,169,495 B1 | | 1/2001 | Koike | |
| 6,687,568 B2 | * | 2/2004 | Ohtsuka et al. | 700/213 |
| 7,194,332 B2 | * | 3/2007 | Fukunari | 700/228 |
| 2004/0254674 A1 | | 12/2004 | Nojo et al. | |

FOREIGN PATENT DOCUMENTS

| | | |
|---|---|---|
| JP | 2000-329572 A | 11/2000 |
| JP | 2001-240241 | 9/2001 |
| JP | 2003-36117 A | 2/2003 |
| JP | 2003-233768 A | 8/2003 |
| JP | 2004-280213 A- | 10/2004 |

OTHER PUBLICATIONS

PCT/ISA/210 for PCT/JP2006/302331.

* cited by examiner

| PROCESS STEP INFORMATION | |
|---|---|
| TRANSFER SOURCE | TRANSFER DESTINATION |
| A | a |
| A | b |
| B | a |
| B | b |
| C | e |
| D | c |
| D | d |
| E | c |
| E | d |

| LAYOUT INFORMATION 1 | | | |
|---|---|---|---|
| TRANSFER SOURCE | CORRESPONDING NODE | TRANSFER SOURCE | CORRESPONDING NODE |
| A | N1 | a | N10 |
| B | N19 | b | N28 |
| C | ... | c | ... |
| D | ... | d | ... |
| E | ... | e | ... |

| LAYOUT INFORMATION 2 | | TRANSFER TIME |
|---|---|---|
| START NODE | END NODE | |
| N1 | N2 | t1 |
| N2 | N3 | t2 |
| N3 | N4 | t1 |
| ... | ... | ... |
| N2 | N11 | t3 |
| N6 | N13 | t3 |
| ... | ... | ... |
| N12 | N5 | t3 |
| N14 | N9 | t3 |
| ... | ... | ... |

FIG. 5A

| TRANSFER SCHEDULE INFORMATION |||||||||
|---|---|---|---|---|---|---|---|---|
| WORK ID | PLANNED NODE PASSAGE TIME ||||||||
| | N1 | N2 | ... | N23 | ... | N36 | ... |
| 105 | 10:00:06 | 10:00:14 | ... | X | ... | X | ... |
| 106 | X | X | ... | 10:01:20 | ... | X | ... |
| 107 | X | X | ... | X | ... | 10:01:33 | ... |
| 108 | 10:00:52 | 10:01:00 | ... | ... | ... | ... | ... |
| 109 | ... | ... | ... | ... | ... | ... | ... |
| 110 | ... | ... | ... | ... | ... | ... | ... |
| ... | ... | ... | ... | ... | ... | ... | ... |

X : NOT PASS

FIG. 5B

| TRANSFER REQUEST STORAGE AREA ||||
|---|---|---|---|
| WORK ID | TRANSFER SOURCE | TRANSFER DESTINATION | PLANNED TRANSFER START TIME |
| 201 | A | a | xx:yy:zz |
| 253 | D | d | xx:yy:nn |
| 144 | B | b | xx:yy:kk |
| | | | |
| | | | |
| | | | |
| | | | |
| | | | |
| | | | |

POINTER →

WORK TRANSFER SYSTEM, ROUTE SETTING METHOD, AND ROUTE SETTING PROGRAM

TECHNICAL FIELD

The present invention relates to a work transfer technique applicable to various kinds of production facilities.

BACKGROUND ART

In a production facility such as a semiconductor manufacturing system, a plurality of kinds of processes are executed for a substrate serving as a work. To do this, a production facility of this type requires transfer of a work between a plurality of processing apparatuses. Work transfer schemes are roughly classified into a system using an automatic guided vehicle (AGV) (e.g., Japanese Patent Laid-Open No. 2004-280213), a system using an aerial train, and a system using a permanently installed transfer unit such as a transferor belt.

On the other hand, a production facility of this type requires improvement of the transfer efficiency so as to process a number of works. Improvement of the transfer efficiency depends on the transfer routes of individual works between the plurality of processing apparatuses. Japanese Patent Laid-Open No. 2004-280213 discloses a technique related to transfer route selection for an AGV. Japanese Patent Laid-Open No. 2003-233768 describes general route searching methods (Dijkstra method and dual Dijkstra method).

In a system using an AGV or aerial train, the AGV or aerial train is temporarily occupied for transfer of a specific work. Such a system is therefore poor in capability for parallelly transferring a mass of works, as compared to a system using a permanently installed transfer unit such as a transferor belt. Additionally, individual units such as an AGV and aerial train tend to be more expensive than a permanently installed transfer unit. If the number of units is increased to improve the transfer capability, the cost of the whole system inevitably rises. Furthermore, transfer control including transfer route selection also becomes complex.

On the other hand, in the system using the permanently installed transfer unit, the transfer unit is permanently installed. For this reason, control specialized to the layout of transfer units is employed for transfer control, and the transfer control is generally determined based on the experiments of engineers (actual operational records of the transfer system in the past). However, along with the recent rapid progress of development technologies, diversified consumer needs, and shortening product lives, the production methods are switching to flexible production systems for small-size batch production. This generates demands for production facilities which allow flexible changes according to enlargement or reduction of the production scale. Regarding this point, the system using the permanently installed transfer unit needs to re-design transfer control from the beginning every time the layout of transfer units changes, or some of them are broken.

DISCLOSURE OF INVENTION

It is therefore an object of the present invention to implement efficient work transfer capable of flexibly coping with a change in system layout.

According to the present invention, there is provided a work transfer system including a plurality of work transfer units which connect a plurality of loading places to a plurality of unloading places, the system comprising a layout information database which stores layout information representing a layout of the plurality of work transfer units, and route setting means for setting, based on the layout information, a route of the work transfer units to pass a work between a planned loading place and a planned unloading place which are required to transfer the work in the plurality of loading places and the plurality of unloading places, the route setting means comprising candidate setting means for setting a plurality of candidates of the route between the planned loading place and the planned unloading place, and route selection means for selecting, based on a predetermined condition, one route from the plurality of candidates of the route set by the candidate setting means.

According to the present invention, there is also provided a route setting method of, in a work transfer system including a plurality of work transfer units which connect a plurality of loading places to a plurality of unloading places, setting a route of the work transfer units to pass a work between a planned loading place and a planned unloading place which are required to transfer the work in the plurality of loading places and the plurality of unloading places, the method comprising the steps of setting, based on layout information representing a layout of the plurality of work transfer units, a plurality of candidates of the route between the planned loading place and the planned unloading place, and selecting, based on a predetermined condition, one route from the plurality of candidates of the route set in the candidate setting step, and a route setting program which causes a computer to execute the route setting process.

In the present invention, the transfer route of a work is set based on the layout information. Hence, when the system layout has changed, only correction of the layout information almost suffices. It is therefore possible to flexibly cope with the change in system layout. The optimum work transfer route is essentially the shortest one. However, when a mass of works are transferred in parallel, interference between the transferred works can cause congestion, and the shortest route is not always optimum. In the present invention, a plurality of work transfer route candidates are set, and one of them is selected based on a predetermined condition. This enables to select a route in consideration of avoiding, for example, work congestion and implement efficient work transfer conforming with actual work transfer.

BRIEF DESCRIPTION OF DRAWINGS

FIG. 5A is a table showing an example of transfer schedule information;

FIG. 5B is a table showing the storage form of transfer requests saved in a transfer request storage area;

BEST MODE FOR CARRYING OUT THE INVENTION

<Layout>

Figure 1:
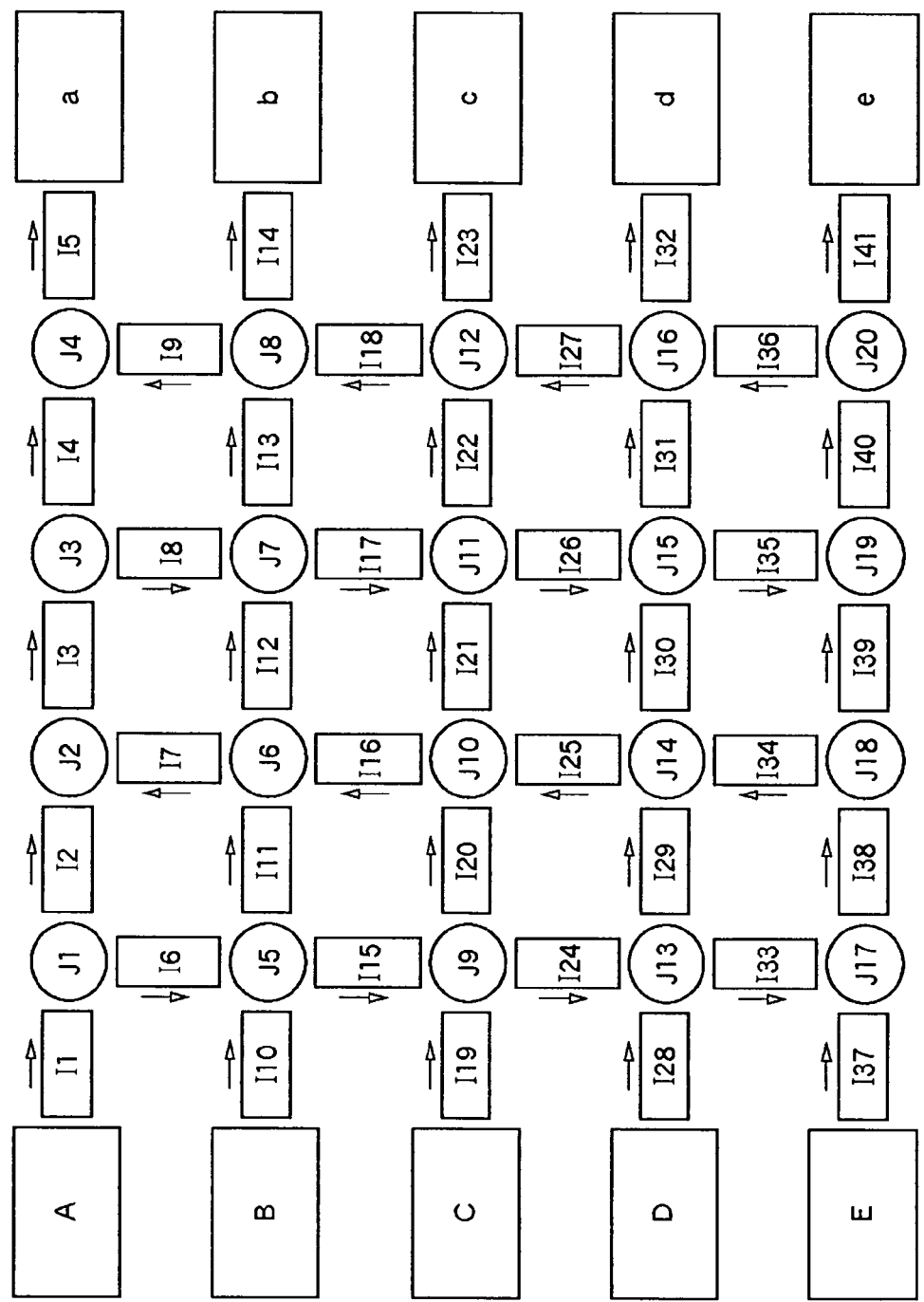
FIG. 1 is a view showing the layout of work transfer units in a work transfer system according to an embodiment of the present invention.

FIG. 1 is a view showing the layout of work transfer units in a work transfer system according to an embodiment of the present invention. Referring to FIG. 1, processing apparatuses A to E form an apparatus group and execute predetermined processes for a transfer target work. In this embodiment, each of the processing apparatuses A to E serves as a work loading place to work transfer units I1 to I41 and J1 to J20 (to be collectively referred to as work transfer units I and J). Processing apparatuses a to e also form an apparatus group and execute predetermined processes for a transfer target work. In this embodiment, each of the processing apparatuses a to e serves as a work unloading place from the work transfer units I and J.

Figure 2A:
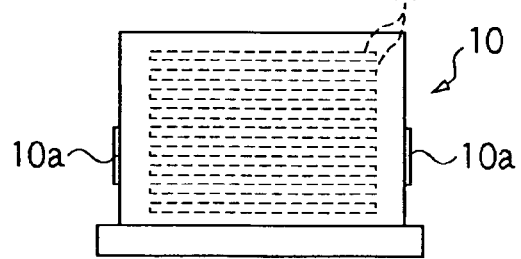
FIG. 2A is a schematic view of a pod 10 as a transfer target of this embodiment.

FIG. 2A is a schematic view of a pod 10 as a transfer target of this embodiment. In this embodiment, substrates 11 are transferred as works. Assume that a plurality of substrates 11 are stored in every pod 10 and transferred. The pod 10 has a hollow box shape and stores a plurality of substrates 11. Each of the processing apparatuses A to E and a to e opens the pod 10 that has arrived there, extracts each substrate 11 from the pod 10, and executes a predetermined process for each extracted substrate 11. When the process finishes, the substrate 11 is returned into the pod 10, and the pod 10 is sealed. The pod 10 has identification portions 10a on the side surfaces.

A work ID to specify the substrates 11 stored in the pod 10 is recorded on each identification portion 10a. This embodiment assumes that a common work ID is added to the block of the plurality of substrates 11 stored in the pod 10. The identification portion 10a can take any form capable of reading a work ID, and for example, an optically readable form such as a barcode, a magnetically readable form, and a form like a wireless IC tag readable by wireless communication are usable.

Referring back to FIG. 1, all the work transfer units I and J are installed types of transfer units. The work transfer unit I transfers a work in only one direction indicated by an arrow in FIG. 1. The work transfer unit J can change the work transfer direction. For example, the work transfer unit J1 can transfer a work received from the work transfer unit I1 to the work transfer unit I2 without changing the transfer direction, or transfer the work to the work transfer unit I6 by changing the direction of the work by 90°.

In this embodiment, the transfer units are actually roughly classified into two types in terms of function. The plurality of work transfer units I which transfer a work in one direction and the plurality of work transfer units J capable of changing the work transfer direction are combined, thereby building a system for implementing various work transfer routes. The system can employ a plurality of kinds of work transfer units, as a matter of course. However, the cost of the entire system can be reduced, and the work transfer control can be simplified by reducing the kinds of work transfer units.

Figure 2B:
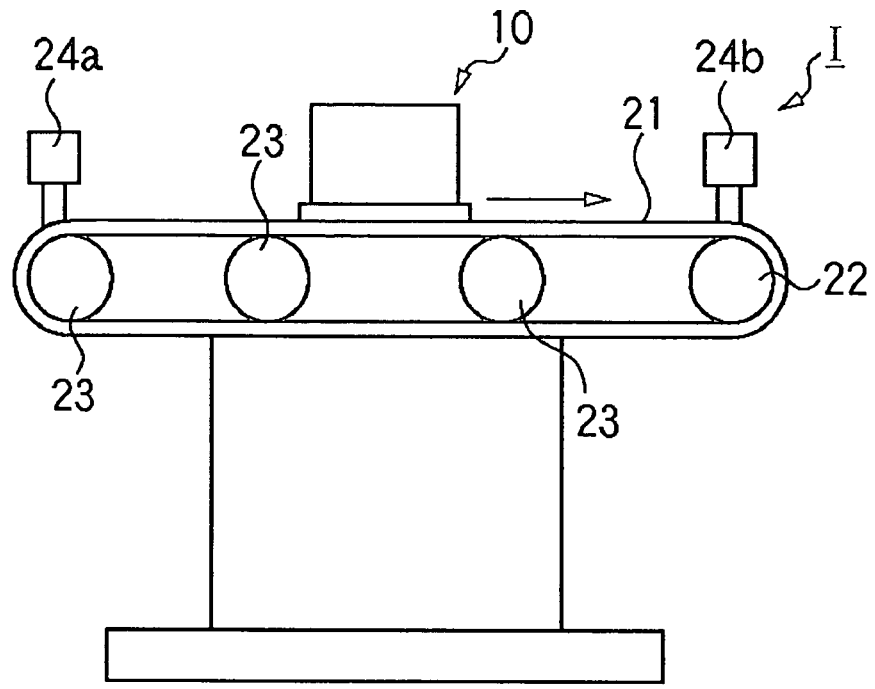
FIG. 2B is a schematic view of a work transfer unit I.

FIG. 2B is a schematic view of the work transfer unit I. In this embodiment, the work transfer unit I is a belt conveyor type transfer unit which comprises an endless belt 21, a driving roller 22 which is rotationally driven by a driving source (not shown), and idle rollers 23. The work transfer unit I transfers the pod 10 on the belt 21 as the driving roller 22 rotates to move the belt 21. A sensor 24a is disposed at an end on the loading side of the work transfer unit I. A sensor 24b is disposed at the other end on the unloading side. The sensors 24a and 24b read the work ID of the identification portion 10a of the pod 10.

Figure 2C:
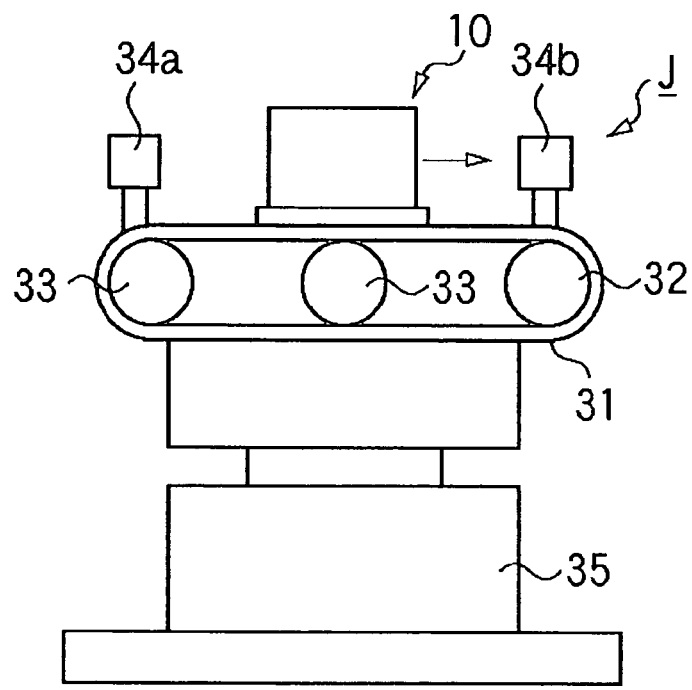
FIG. 2C is a schematic view of a work transfer unit J.

FIG. 2C is a schematic view of the work transfer unit J. In this embodiment, the work transfer unit J is a belt conveyor type transfer unit which comprises an endless belt 31, a driving roller 32 which is rotationally driven by a driving source (not shown), and idle rollers 33. The work transfer unit J transfers the pod 10 on the belt 31 as the driving roller 32 rotates to move the belt 31. A sensor 34a is disposed at an end on the loading side of the work transfer unit J. A sensor 34b is disposed at the other end on the unloading side. The sensors 34a and 34b read the work ID of the identification portion 10a of the pod 10. A turn unit 35 turns the whole belt conveyor portion (31 to 34) above it, thereby changing the transfer direction of the pod 10.

The layout shown in FIG. 1 is merely an example. According to this embodiment, various layouts can be employed and flexibly changed. This embodiment assumes that a work is transferred between two apparatus groups: the apparatus group of processing apparatuses A to E and the apparatus group of processing apparatuses a to e. However, it is also possible to employ a layout for transferring a work between three or more apparatus groups. It is also possible to employ a layout for transferring a work between various kinds of apparatuses, for example, a layout for transferring a work between a processing apparatus group and an automated warehouse.

<Control Block>

Figure 3:
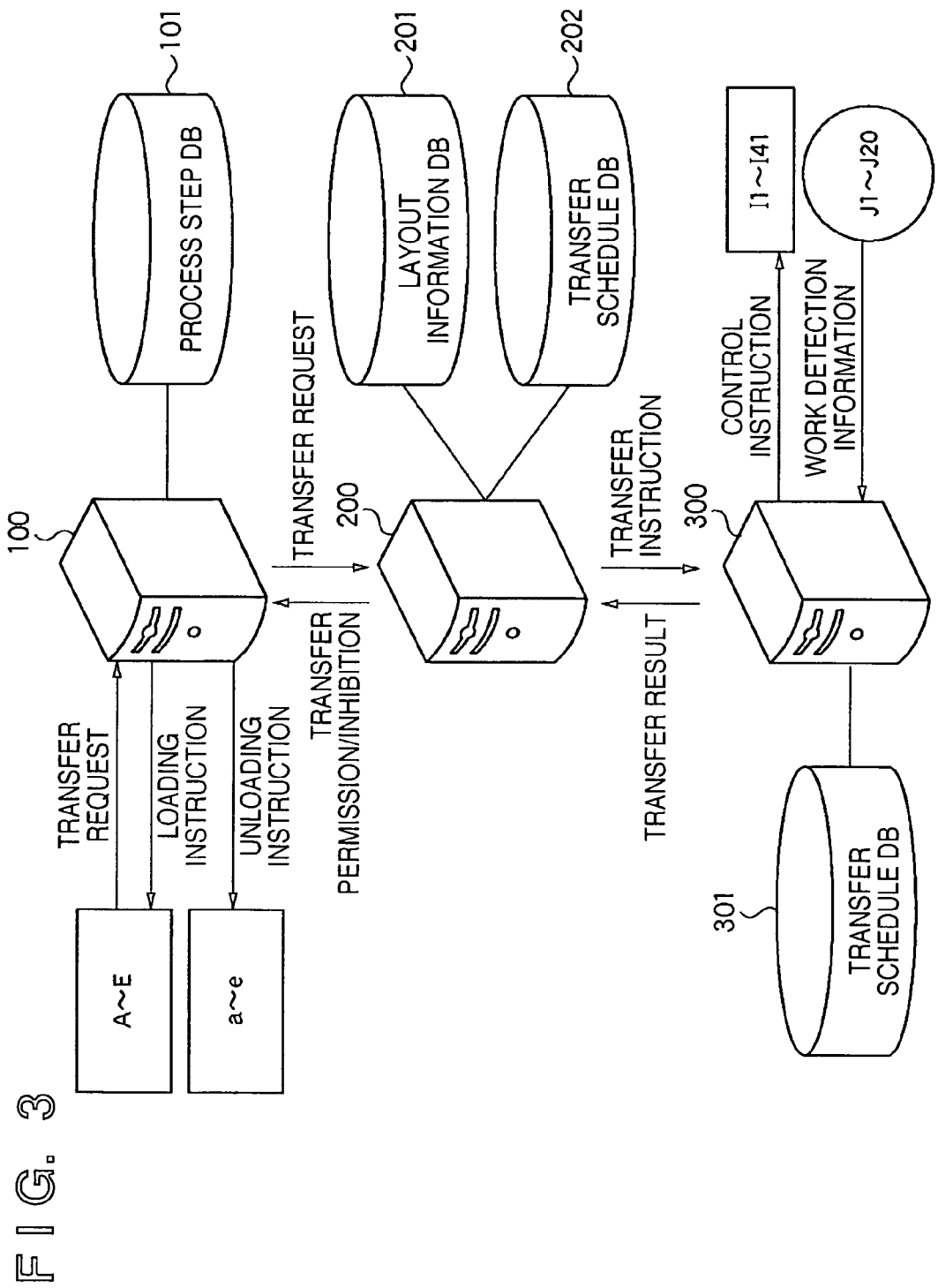
FIG. 3 is a block diagram of the control system of the work transfer system according to the embodiment.

FIG. 3 is a block diagram of the control system of the work transfer system according to this embodiment. The work transfer system of this embodiment comprises a host server 100, transfer management server 200, and transfer control server 300. These servers are designed to be able to communicate information to each other through wired or wireless communication channels.

The host server 100 is designed to be able to communicate information to the processing apparatuses A to E and a to e through wired or wireless communication channels. When one of the processing apparatuses A to E finishes a process for a work and is to transfer the pod 10 to the next step, the processing apparatus transmits a transfer request to the host server 100. If it is possible to respond to the work transfer request, the host server 100 transmits a loading instruction (instruction to transfer the pod 10 to the work transfer unit I) to the transfer request transmission source in the processing apparatuses A to E. In response to the loading instruction, the corresponding one of the processing apparatuses A to E transfers the pod 10 to the work transfer unit I. When transfer of the pod 10 is ended, the host server 100 transmits an unloading instruction (instruction to acquire the pod 10 from the work transfer unit I) to the transfer destination in the processing apparatuses a to e. In response to the unloading instruction, the corresponding one of the processing apparatuses a to e acquires the pod 10 from the work transfer unit I.

Figures 4A, 4B, 4C:
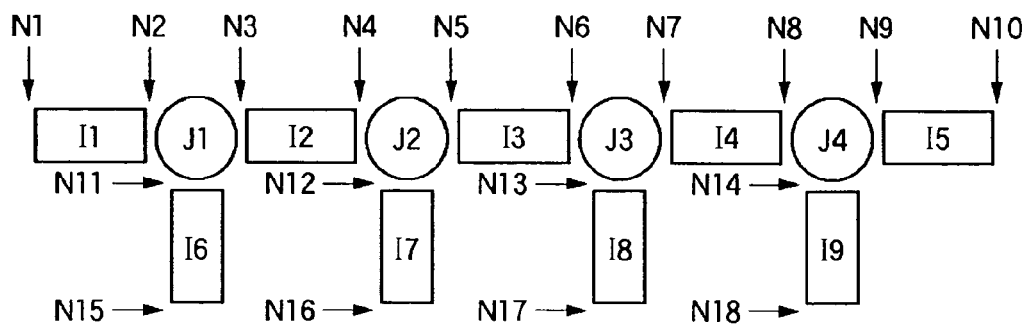
FIG. 4A is a table showing an example of process step information.
FIG. 4B is a table showing an example of layout information.
FIG. 4C is an explanatory view of nodes.

A process step DB (database; the same shall apply hereinafter) 101 is formed in a storage means such as the internal or external hard disk of the host server 100 and stores process step information representing the work transfer relationship between the processing apparatuses A to E and the processing apparatuses a to e. FIG. 4A is a table showing an example of process step information. For example, a work transferred from the processing apparatus A, that is, the substrate 11 that has undergone the process in the processing apparatus A is scheduled to be processed by the processing apparatus a or b in the next step. Hence, the processing apparatuses a and b are set as transfer destinations. This embodiment assumes that the work transfer relationship is preset. However, the setting may be changed in accordance with the situation. A method of determining the work transfer relationship in every work transfer is also usable.

In response to the transfer request from the host server 100, the transfer management server 200 sets the transfer route of the pod 10. The transfer management server 200 also determines whether to start transferring the pod 10 as the transfer target in response to the work transfer request and transmits the determination result to the host server 100. When transfer of the pod 10 is ended, the transfer management server 200 transmits it to the host server 100 as a transfer result.

A layout information DB 201 is formed in a storage means such as the internal or external hard disk of the transfer management server 200 and stores layout information representing the layout of the work transfer units I and J. FIG. 4B is a table showing an example of layout information. In this embodiment, the layout information is roughly classified into layout information 1 and 2. Both employ a data format according to a transfer route setting process to be described later. More specifically, the layout of the work transfer units I and J is defined by nodes which indicate the connection points between the work transfer units I and J, the work loading ends from the processing apparatuses A to E, and the work unloading ends to the processing apparatuses a to e. When the layout of the work transfer units I and J is defined by nodes, a data format suitable for route searching in the route setting process is obtained. FIG. 4C is an explanatory view of nodes according to this embodiment.

A node N1 indicates the loading end of the work transfer unit I1. The node N1 is the start node of work transfer from the processing apparatus A. A node N10 indicates the unloading end of the work transfer unit I5. The node N10 is the end node of work transfer to the processing apparatus a. A node N2 indicates the connection point between the work transfer units I1 and J1. In this way, nodes are assigned to the connection points between the work transfer units I and J, the work loading ends from the processing apparatuses A to E, and the work unloading ends to the processing apparatuses a to e.

Referring back to FIG. 4B, the layout information 1 associates each of the processing apparatuses A to E serving as a transfer source with a corresponding node (node serving as a work transfer start point corresponding to the processing apparatus). The layout information 1 also associates each of the processing apparatuses a to e serving as a transfer destination with a corresponding node (node serving as a work transfer end point corresponding to the processing apparatus).

The layout information 2 represents the work transfer units I and J and the work transfer directions between the work transfer units I and J by using the nodes. A "start node" indicates a node on the work loading side. An "end node" indicates a node on the work unloading side. For example, "start node: N1, end node: N2" indicates that a work can be transferred from the node N1 to the node N2 (in this example, the work transfer unit I1 transfers a work to the work transfer unit J1). For example, "start node: N2, end node: N11" indicates that a work can be transferred from the node N2 to the node N11 (the work transfer unit J1 transfers a work to the work transfer unit I6).

The layout information 2 defines the relationship between all "start nodes" and "end nodes" scheduled as transfer routes. The layout information 2 does not define the relationship between "start nodes" and "end nodes" which are not scheduled as transfer routes. For example, as shown in FIG. 1, the work transfer unit I6 transfers a work from the work transfer unit J1 to the work transfer unit J5. Transfer in a reverse direction is not scheduled. Hence, the relationship between "start node: N11" and "end node: N3 (or N2)" (FIG. 4C) is not defined.

The layout information DB 201 also stores times of work transfer by the work transfer units I and J, as indicated by "transfer time" in FIG. 4B. For example, between "start node: N1" and "end node: N2", a work is transferred to the work transfer unit I1 (FIG. 4C), and "transfer time" indicates the standard work transfer time of the work transfer unit I1.

Referring back to FIG. 3, a transfer schedule DB 202 is formed in a storage means such as the internal or external hard disk of the transfer management server 200. The transfer schedule DB 202 stores, for each work whose transfer route is set by a process to be described later, transfer schedule information including the planned transfer start time of the work, and the planned time of passage through each of the work transfer units I and J on the transfer route of the work. Each transfer schedule information is registered in the transfer schedule DB 202 when a work transfer route is set, and the start of transfer is determined. When transfer is ended, the transfer schedule information is erased.

FIG. 5A is a table showing an example of transfer schedule information. Planned node passage times are recorded in correspondence with each work (pod 10) specified by a work ID. Of the planned node passage times, the planned passage time for a node (e.g., node N1) serving as a work transfer start point corresponding to a transfer source in the processing apparatuses A to E is a planned transfer start time. In FIG. 5A, "x" added to a node indicates that the work does not pass through the node.

Referring back to FIG. 3, the transfer control server 300 is designed to be able to communicate information to the work transfer units I and J through wired or wireless communication channels and control the operations of the transfer units. A transfer schedule DB 301 is formed in a storage means such as the internal or external hard disk of the transfer control server 300 and stores information identical to that in the above-described transfer schedule DB 202. Transfer schedule information generated by the transfer management server 200 is transmitted to the transfer control server 300 together with a work transfer instruction. The transfer control server 300 sequentially stores the received transfer schedule information in the transfer schedule DB. The transfer schedule information of a work whose transfer is ended is deleted.

The work transfer units I and J read the identification portions 10a of the pod 10 by the sensors 24a and 24b and the sensors 34a and 34b and transmit the reading result to the transfer control server 300 as work detection information. Upon receiving the work detection information, the transfer control server 300 determines the control contents by referring to the transfer schedule DB 301 and transmits a control instruction to the work transfer units I and J which have transmitted the work detection information. Upon receiving the control instruction, the work transfer units I and J execute an operation corresponding to the received control instruction.

<Processes of Servers>

<Host Server 100>

Figure 6:
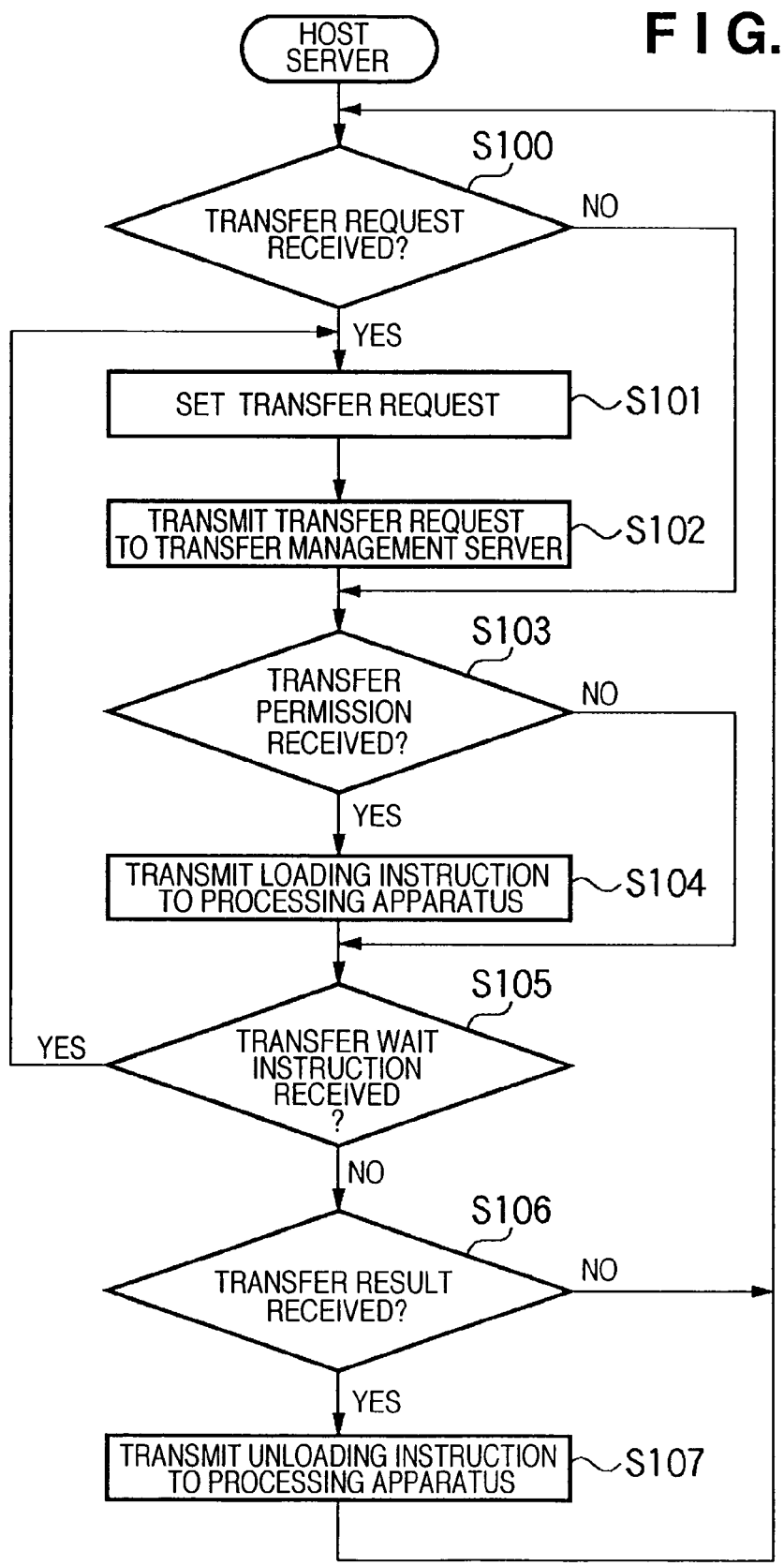
FIG. 6 is a flowchart illustrating a process executed by a host server 100.

FIG. 6 is a flowchart illustrating a process executed by the host server 100. In step S100, the host server 100 determines whether a work transfer request is received from one of the processing apparatuses A to E. A work transfer request from the processing apparatuses A to E is done by specifying the work ID indicated by the identification portion 10a of the pod 10 as the transfer target and one of the processing apparatuses A to E, which serves as the subject of the transfer request. If YES in step S100, the process advances to step S101. Otherwise, the process advances to step S103.

In step S101, the contents of a transfer request to be transmitted to the transfer management server 200 are set in correspondence with the transfer request received in step S100. In this case, a work ID, a transfer source in the processing apparatuses A to E which has transmitted the transfer request, and a transfer destination in the processing apparatuses a to e, and a planned transfer start time are set. The transfer destination in the processing apparatuses a to e is set by referring to the process step DB 101. The planned transfer start time can be set in accordance with a predetermined rule (e.g., several minutes after the current time). In step S102, the transfer request is transmitted to the transfer management server 200 together with the contents set in step S101.

In step S103, the host server 100 determines whether a response (transfer permission) to the transfer request already transmitted to the transfer management server 200 is received from the transfer management server 200. If YES in step S103, the process advances to step S104. Otherwise, the process advances to step S105. In step S104, in correspondence with the transfer permission received in step S103, a loading instruction (instruction to transfer the pod 10 to the work transfer unit I) is transmitted to one of the processing apparatuses A to E, which has transmitted the transfer request corresponding to the transfer permission to the host server 100. The transfer instruction is transmitted with a specified planned transfer start time. Upon receiving the loading instruction, the corresponding one of processing apparatuses A to E transfers the pod 10 to the work transfer unit I at the planned transfer start time.

In step S105, the host server 100 determines whether a response (transfer wait instruction) to the transfer request already transmitted to the transfer management server 200 is received from the transfer management server 200. If YES in step S103, the process returns to step S101 to set the transfer request again (change the planned transfer start time). Otherwise, the process advances to step S106. In step S106, it is determined whether a transfer result (work transfer end) is received from the transfer management server 200. The transfer result contains the work ID indicated by the identification portion 10a of the pod 10 whose transfer is ended, and the transfer destination in the processing apparatuses a to e. If YES in step S106, the process advances to step S107. Otherwise, the process returns to step S100.

In step S107, an unloading instruction (instruction to acquire the pod 10 from the work transfer unit I) is transmitted to the transfer destination in the processing apparatuses a to e in correspondence with the transfer result received in step S106. Upon receiving the unloading instruction, the corresponding one of the processing apparatuses a to e acquires the pod 10 from the work transfer unit I. After the process in step S107, the process returns to step S100 to repeat the same process.

<Transfer Management Server 200>

Figure 7A:
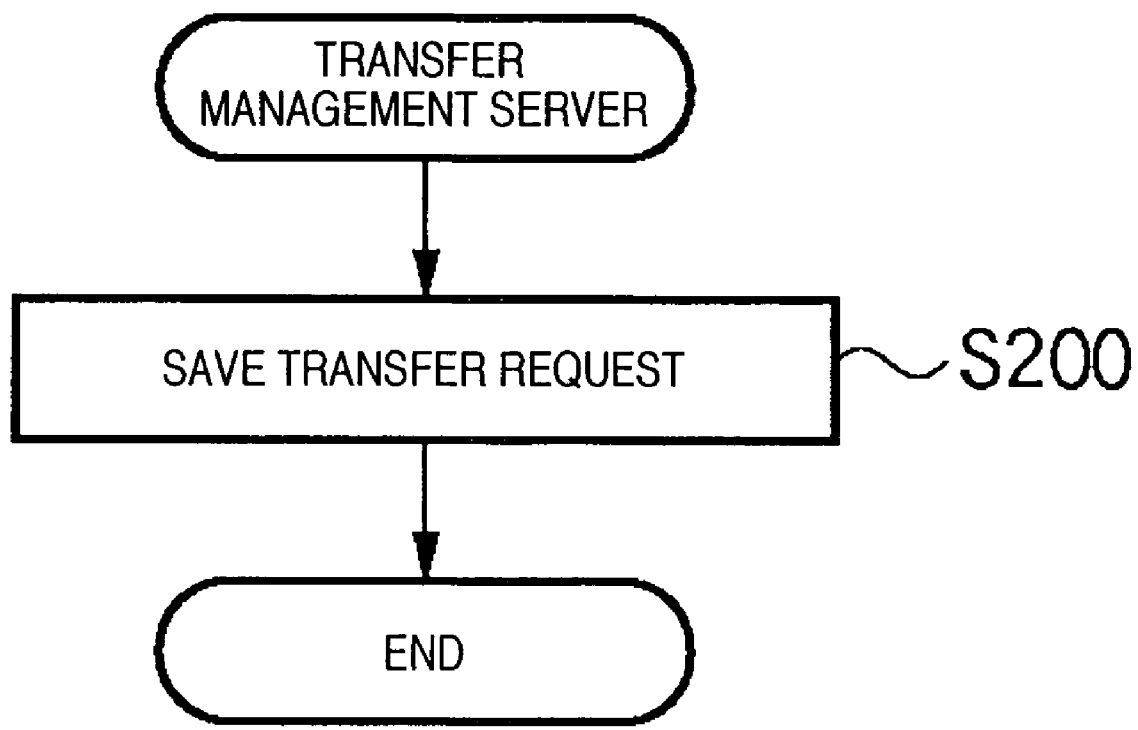
FIG. 7A is a flowchart illustrating the interrupt process of a transfer management server 200.
Figure 7B:
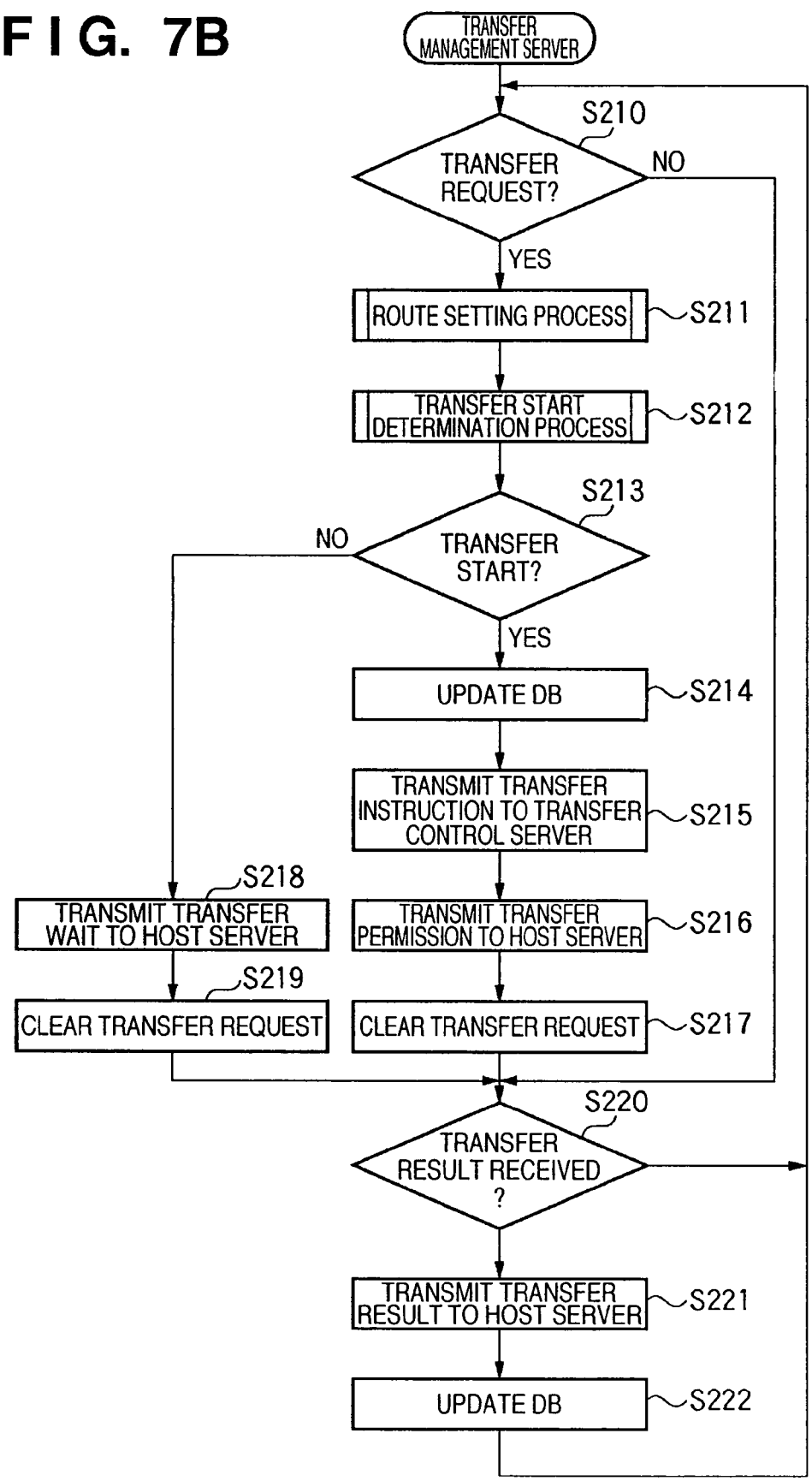
FIG. 7B is a flowchart illustrating the main process of the transfer management server 200.

FIG. 7A is a flowchart illustrating the interrupt process of the transfer management server 200. FIG. 7B is a flowchart illustrating the main process of the transfer management server 200. The interrupt process will be described first. Upon receiving the transfer request from the host server 100, the transfer management server 200 executes the interrupt process shown in FIG. 7A.

In step S200, the transfer management server 200 saves the transfer request received from the host server 100 in a predetermined storage area (called a transfer request storage area) of the internal memory. FIG. 5B is a table showing the storage form of transfer requests saved in the transfer request storage area. A received transfer request is saved at an address indicated by a pointer. After saving, the pointer moves by one step.

The main process of the transfer management server 200 will be described next with reference to FIG. 7B. In step S210, the transfer management server 200 determines whether a transfer request is saved in the transfer request storage area. If YES in step S210, the earliest transfer request is selected (to be referred to as a selected transfer request hereinafter), and the process from step S211 is executed. Otherwise, the process advances to step S220.

In step S211, a route setting process is executed. In this case, based on the layout information stored in the transfer schedule DB 202, the transfer route of the work transfer units I and J through which the work should pass is set between the planned loading place and the planned unloading place as the targets of the work transfer request in the processing apparatuses A to E (loading places) and processing apparatuses a to e (unloading places). Additionally, transfer schedule information is set for the work as the target of the selected transfer request. This will be described later in detail.

In step S212, a transfer start determination process is executed. In this case, it is determined whether to start transferring the work at the planned transfer start time by using the transfer route set in step S211. This will be described later in detail. In step S213, it is determined based on the result of the process in step S212 whether the work as the target of the selected transfer request is to be set as the transfer start target. If transfer start is set in step S213, the process advances to step S214. If transfer wait is set, the process advances to step S218.

In step S214, the transfer schedule DB 202 is updated, and the transfer schedule information set in step S211 is added to the transfer schedule DB 202. In step S215, a transfer instruction is transmitted to the transfer control server 300 together with the transfer schedule information set in step S211. In step S216, a transfer permission related to the selected transfer request is transmitted to the host server 100. In step S217, the selected transfer request is deleted from the transfer request storage area. In step S218, a transfer wait instruction related to the selected transfer request is transmitted to the host server 100. With the transfer wait instruction, transfer of the work corresponding to the selected transfer request is withheld temporarily. In step S217, the selected transfer request is deleted from the transfer request storage area.

In step S220, it is determined whether the transfer result (transfer end) of the work as the target of the transfer instruction (S215) already transmitted to the transfer control server 300 is received. If YES is step S220, the process advances to step S221. Otherwise, the process returns to step S210. In step S221, the work transfer result received is step S220 is transmitted to the host server 100. In step S222, the transfer schedule DB 202 is updated, and the transfer schedule information of the work whose transfer result is received in step S220 is deleted from the transfer schedule DB 202. Then, the process returns to step S210 to repeat the same process.

<Route Setting Process>

Figure 8A:
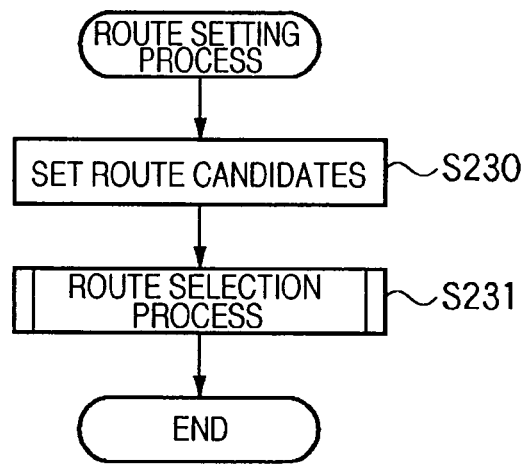
FIG. 8A is a flowchart illustrating a route setting process in step S211.

FIG. 8A is a flowchart illustrating the route setting process in step S211. In step S230, a route candidate setting process is executed. In this process, a plurality of transfer route candidates between the planned loading place and the planned unloading place for the selected transfer request are set. First, a node (to be referred to as a start node hereinafter) corresponding to the transfer source in the processing apparatuses A to E and a node (to be referred to as an end node hereinafter) corresponding to the transfer destination in the processing apparatuses a to e, which are indicated by the selected transfer request, are specified from the layout information 1 (FIG. 4B) stored in the layout information DB 201. Next, routes that connect the start node and end node are searched for based on the layout information 2 (FIG. 4B) stored in the layout information DB 201.

Various kinds of route search algorithms can be employed. Any algorithm capable of searching for a plurality of routes is usable. The dual Dijkstra method can be employed here with a relatively small amount of calculation. The dual Dijkstra method is a known route search algorithm (Japanese Patent Laid-Open No. 2003-233768), and a detailed description thereof will be omitted. In this embodiment, each of the work transfer units I and J, through which a work can pass between the planned loading place and the planned unloading place, is set as a via point. The shortest route for each via point is set as a transfer route candidate. The nodes are used for the calculation. That is, the dual Dijkstra method is applied to arbitrary nodes serving as via points on each route settable as a transfer route between the start node and the end node.

Figure 8B:
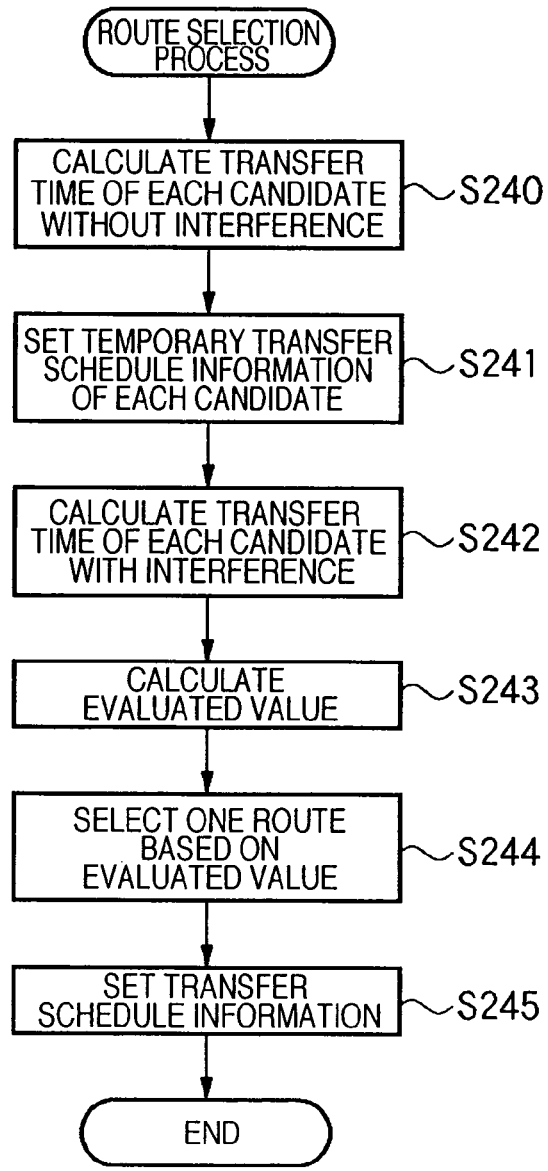
FIG. 8B is a flowchart illustrating a route selection process in step S231.

In step S231, a route selection process is executed. In this process, a transfer route is selected from the plurality of transfer route candidates set in step S230. Various selection conditions are settable. In this embodiment, a route is selected based on the transfer time predicted in actual work transfer. FIG. 8B is a flowchart illustrating the route selection process in step S231.

In step S240, a transfer time without interference with another work (when interference is neglected) is referred to for each of the plurality of transfer routes set in step S230. The transfer time is calculated based on the layout information 2 (FIG. 4B) stored in the layout information DB 201. That is, since a transfer route is formed by combining a plurality of start nodes and end nodes in the layout information 2, a transfer time can be calculated by sequentially adding those in the respective start nodes and end nodes.

In step S241, the above-described transfer schedule information without interference with another work is temporarily set for each of the plurality of transfer routes set in step S230. The temporary transfer schedule information can be set by calculating the planned passage time of each node by adding the transfer time to each node on the transfer route to the planned work transfer start time indicated by the selected transfer request based on the layout information 2 (FIG. 4B).

In step S242, a transfer time including a wait time for avoiding interference with another work which has an already set transfer route is calculated based on the temporary transfer schedule information of each transfer route set in step S241. This embodiment assumes that a work having an early set transfer route be transferred with a higher priority than a work having a transfer route set later. More specifically, if two works interfere in a node, a work which has an early set transfer route is given a higher priority. The other work which has a transfer route set later must temporarily wait before the node. The transfer schedule information is set based on this assumption. Hence, the transfer control server 300 controls the work transfer units I and J to transfer the work with the early set transfer route with a higher priority than the work with the transfer route set later.

In step S242, each transfer schedule information already set in the transfer schedule DB 202 is referred to. The planned passage time of each node set in the temporary transfer schedule information is checked in order from the upstream side, thereby checking whether interference with another work would occur.

For example, assume that the temporary transfer schedule information sets that a work should pass through a node N23 at 10:01:22. Referring to the transfer schedule information in FIG. 5A, a work (pod 10) with a work ID: 106 should pass through the node N23 at 10:01:20. Since the time difference is 2 sec, the works may interfere. A time for avoiding interference, for example, a wait time of 30 sec is added to correct the planned passage time of the node N23 in the temporary transfer schedule information to 10:01:50. The planned passage time of each node downstream of the node N23 is also corrected by adding 30 sec. In a similar manner, the planned passage time of each node is checked, and the temporary transfer schedule information is corrected. When the correction is done up to the end node, the time difference between the planned transfer start time of the start node and the planned passage time of the end node is calculated as the transfer time of the transfer route. This process is executed for all transfer route candidates, thereby calculating the transfer time of each transfer route.

In step S243, the route selection evaluated value of each candidate is calculated based on the transfer time (Tnw) without work interference and the transfer time (Tw) including a wait time for avoiding work interference, which are calculated for each transfer route candidate. Generally, when a number of works are continuously loaded into the transfer system, the works interfere with each other, and congestion occurs, although the loading itself is not impeded. The congestion causes new congestion, and in the worst case, the whole system stops. In this embodiment, the congestion state of each transfer route candidate is evaluated based on the route selection evaluated value to be described below, thereby selecting an optimum transfer route.

In this embodiment, Tw/Tnw is normalized within the range of 0 to 1 (a sigmoid function is used here), and the route selection evaluated value is obtained by Route selection evaluated value=$\{2/(1+e^{-a(Tw/Tnw-1)})\}-1$ a: the slope of the sigmoid function The route selection evaluated value takes a value of 0 to 1. As the route selection evaluated value approaches 1, it indicates that the transfer route tends to cause congestion.

In step S244, one transfer route is selected from the plurality of transfer route candidates based on the route selection evaluated value calculated in step S243. In this embodiment, a transfer route having a minimum route selection evaluated value is selected. Alternatively, several short routes may be selected from the plurality of routes set by, for example, the dual Dijkstra method, and a route with a minimum route selection evaluated value may finally be selected from the selected routes. In step S255, the transfer schedule information of the transfer route selected in step S244 is set. As the transfer schedule information, the transfer schedule information temporarily set in step S241 and corrected by the transfer time calculation process in step S242 can be used. The route selection process is thus ended, and the route setting process is ended.

<Transfer Start Determination Process>

Figure 8C:
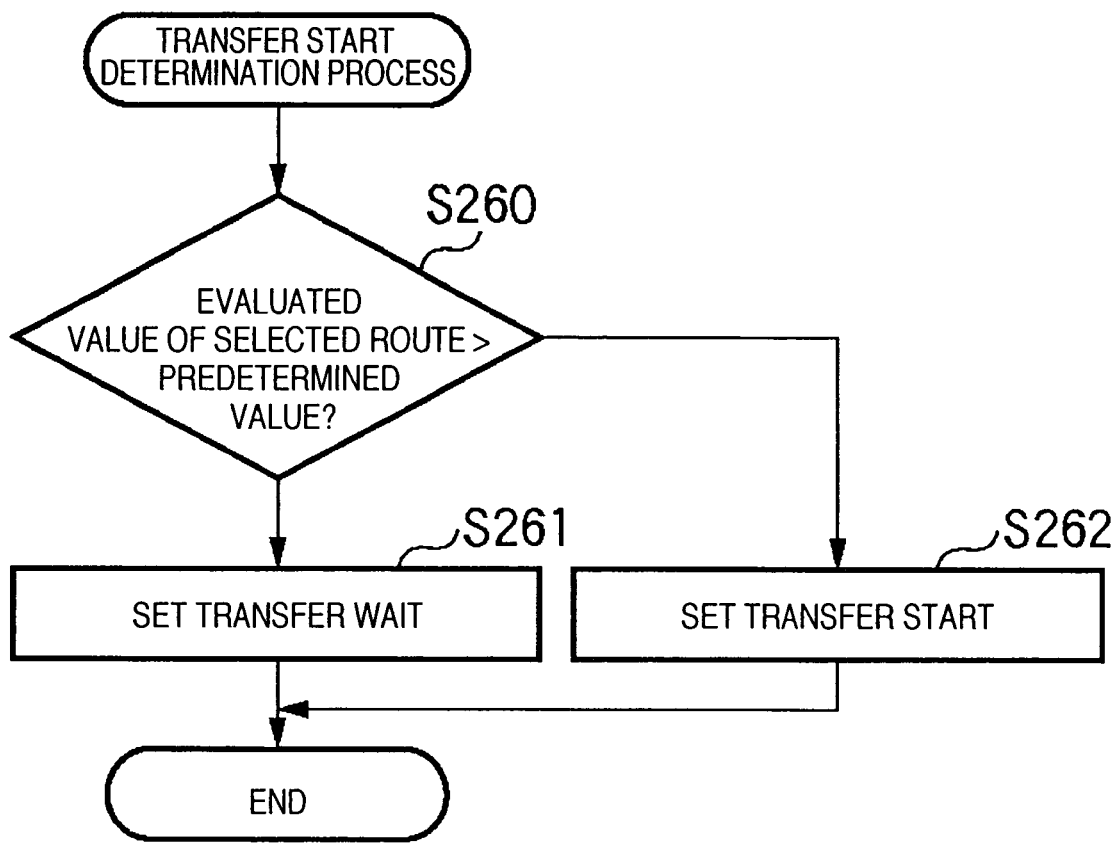
FIG. 8C is a flowchart illustrating a transfer start determination process in step S212.

FIG. 8C is a flowchart illustrating the transfer start determination process in step S212. In step S260, the route selection evaluated value of the transfer route selected in step S244 is set as a transfer start evaluated value, and it is determined whether the transfer start evaluated value is larger than a predetermined value. If YES in step S260, the process advances to step S261 to set transfer wait. If NO in step S260, the process advances to step S262 to set transfer start. When the transfer start evaluated value exceeds the predetermined value, the transfer route selected as an optimum one also tends to cause congestion. Hence, transfer of a new work is temporarily withheld to relieve congestion. The process is thus ended.

<Transfer Control Server 300>

Figure 9:
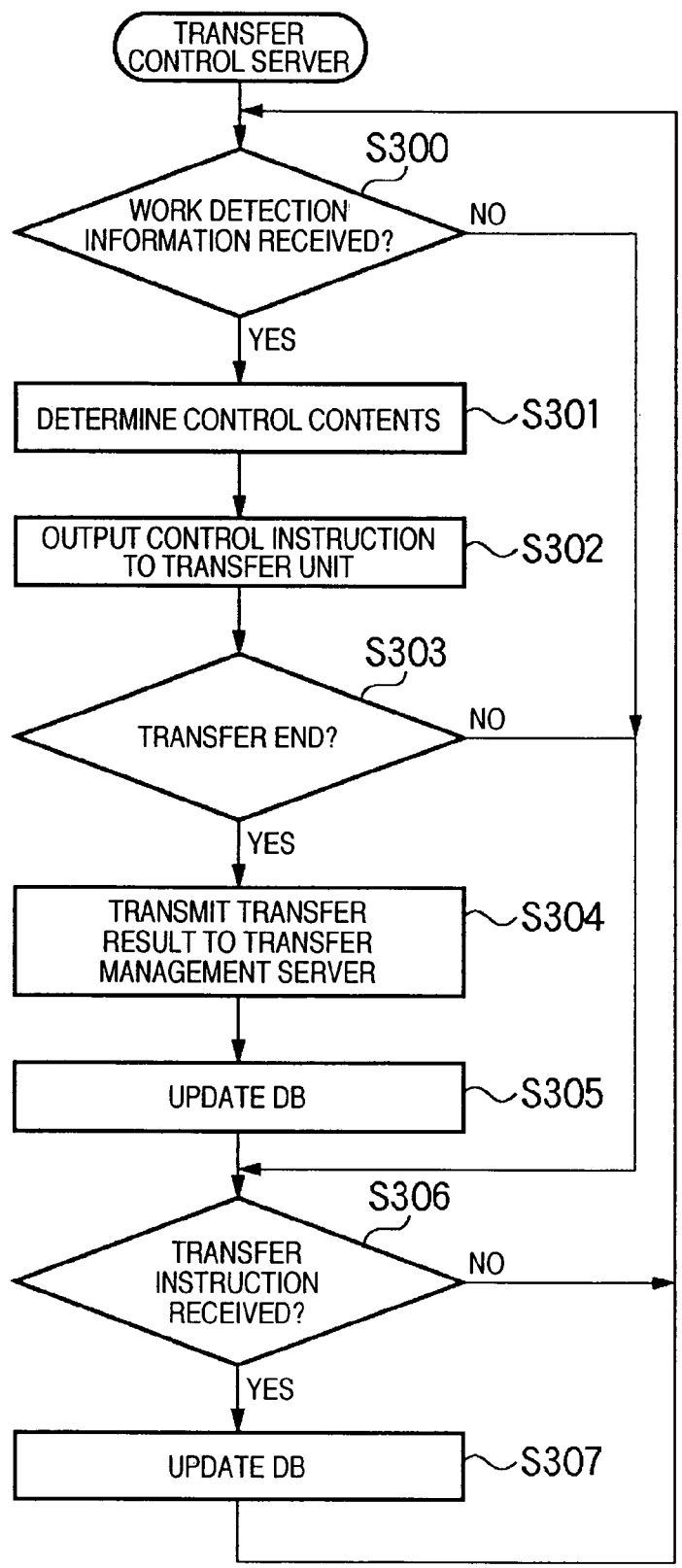
FIG. 9 is a flowchart illustrating a process executed by a transfer control server 300.

FIG. 9 is a flowchart illustrating a process executed by the transfer control server 300. In step S300, the transfer control server 300 determines whether work detection information is received from the work transfer units I and J. The work detection information contains information representing which sensor of which one of the work transfer units I and J has detected which pod 10 (work ID). If YES in step S300, the process advances to step S301. Otherwise, the process advances to step S306.

In step S301, the control contents for the work detection information transmission source in the work transfer units I and J are determined based on the work detection information received in step S300. More specifically, transfer schedule information corresponding to the work ID contained in the received work detection information is read out from the transfer schedule DB 301. Next, a node through which the pod 10 is currently passing is specified from the work detection information transmission source in the work transfer units I and J and the sensor (24a, 24b, 34a, or 34b) which has read the identification portion 10a. A node next to the node and the planned passage time of the next node are specified based on the transfer schedule information. The control contents (presence/absence of wait time, start/end of transfer, and transfer direction) are determined based on the specified net node and its planned passage time.

In step S302, a control instruction to execute the control contents determined in step S301 is transmitted to the work detection information transmission source in the work transfer units I and J. In step S303, it is determined whether the current node of the pod 10 specified in step S301 is a node indicating a work unloading end (e.g., node N10 in FIG. 4C) to one of the processing apparatuses a to e. If YES in step S303, the process advances to step S304. Otherwise, the process advances to step S305. If YES in step S303, it indicates that the work has reached the transfer destination, and the work transfer is ended.

In step S304, the transfer result (transfer end) is transmitted to the transfer management server 200. The transfer result is transmitted with a specified work ID. In step S305, the transfer schedule DB 301 is updated, and the transfer schedule information of the transferred work is deleted from the transfer schedule DB 301. In step S306, it is determined whether a transfer instruction is received from the transfer management server 200. If YES in step S306, the process advances to step S307. Otherwise, the process returns to step S300. In step S307, the transfer schedule DB 301 is updated, and the transfer schedule information of the work indicated by the received transfer instruction is added to the transfer schedule DB 301. Then, the process returns to step S300 to repeat the same process.

As described above, in the work transfer system of this embodiment, the transfer route of a work is set based on layout information (FIG. 4B). Hence, when the system layout has changed due to enlargement or reduction of the production scale or breakdown of some of the work transfer units I and J, only correction of the layout information almost suffices. It is therefore possible to flexibly cope with the change in system layout.

Particularly in this embodiment, layout information employs a data format according to the transfer route setting process. Hence, it is unnecessary to change the algorithm of the route setting process or the control algorithm of the transfer control server 300 along with the change in layout. Correction of only the layout information suffices.

The optimum work transfer route is essentially the shortest one. However, when a mass of works are transferred in parallel, interference between the transferred works can cause congestion, and the shortest route is not always optimum. In this embodiment, a plurality of work transfer route candidates are set, and one of them is selected based on a predetermined condition. This enables to select a route in consideration of avoiding, for example, work congestion and implement efficient work transfer conforming with actual work transfer.

In this embodiment, in selecting a transfer route from a plurality of transfer route candidates, the congestion tendency of each transfer route is evaluated using a route selection evaluated value. This allows setting a transfer schedule (FIG. 5A) that avoids congestion predicted in actual work transfer by relatively simple calculation and evaluation. In addition, whether to start or temporarily withhold work transfer is evaluated by using a transfer start evaluated value, thereby avoiding congestion of the entire system predicted in actual work transfer by relatively simple calculation and evaluation.

The invention claimed is:

1. A work transfer system including a plurality of work transfer units which connect a plurality of loading places to a plurality of unloading places, the system comprising:

a layout information database which stores layout information representing a layout of the plurality of work transfer units; and route setting means implemented within a computer for setting, based on the layout information, a route of the work transfer units to pass a work between a planned loading place and a planned unloading place which are required to transfer the work in the plurality of loading places and the plurality of unloading places, wherein the plurality of work transfer units are constituted from a plurality of first work transfer units which transfer the work in one direction and a plurality of second work transfer units capable of changing a work transfer direction, the first and second work transfer units transferring the work by receiving and sending the work between two adjacent work transfer units, said route setting means comprising:

candidate setting means for setting a plurality of candidates of the route between the planned loading place and the planned unloading place; and route selection means for selecting, based on a predetermined condition, one route from the plurality of candidates of the route set by said candidate setting means, said route selection means calculating a route selection evaluated value by $$\text{Route selection evaluated value} = \{2/(1+e^{-\alpha(Tw/Tnw-1)})\}-1$$

where Tnw is a transfer time without interference with another work, Tw is a transfer time including the wait time for avoiding interference with another work which has an already set route, and a is a slope of a sigmoid function; and said candidate setting means sets, as a via point, each of the plurality of work transfer units capable of passing the work between the planned loading place and the planned unloading place and sets a shortest route as the candidate of the route for each via point.

2. The work transfer system according to claim 1, characterized by further comprising determination means for determining whether to start transferring the work at a planned transfer start time through the route set by said route setting means, wherein said determination means sets transfer start when the route selection evaluated value of the route set by said route setting means is not larger than a predetermined value and sets transfer wait when the route selection evaluated value of the route set by said route setting means is larger than the predetermined value.

3. The work transfer system according to claim 1, further comprising a database which stores, for each work whose route is set by said route setting means, a planned transfer start time of the work and a planned passage time of the work in each of the work transfer units on the route.

4. A route setting method of, in a work transfer system including a plurality of work transfer units which connect a plurality of loading places to a plurality of unloading places, setting a route of the work transfer units to pass a work between a planned loading place and a planned unloading place which are required to transfer the work in the plurality of loading places and the plurality of unloading places, the plurality of work transfer units being constituted from a plurality of first work transfer units which transfer the work in one direction and a plurality of second work transfer units capable of changing a work transfer direction, the first and second work transfer units transferring the work by receiving and sending the work between two adjacent work transfer units, the method comprising the steps of:

setting, in a computer, based on layout information representing a layout of the plurality of work transfer units, a plurality of candidates of the route between the planned loading place and the planned unloading place; and selecting, in a computer, based on a predetermined condition, one route from the plurality of candidates of the route set in the candidate setting step, said route selection means calculating a route selection evaluated value by:

$$\text{Route selection evaluated value} = \{2/(1+e^{-a(Tw/Tnw-1)})\}-1$$

where Tnw is a transfer time without interference with another work, Tw is a transfer time including the wait time for avoiding interference with another work which has an already set route, and a is a slope of a sigmoid function, wherein in the candidate setting step, each of the plurality of work transfer units capable of passing the work between the planned loading place and the planned unloading place is set as a via point, and a shortest route is set as the candidate of the route for each via point.

* * * * *